United States Patent [19]

Staar

[11] 4,048,661
[45] Sept. 13, 1977

[54] DEVICE FOR GUIDING AND WINDING MAGNETIC TAPE IN RECORDING AND/OR REPRODUCING APPARATUS

[75] Inventor: Theophiel Clement Jozef Lodewijk Staar, Kraainem, Belgium

[73] Assignee: Staar, S.A., Brussels, Belgium

[21] Appl. No.: 600,088

[22] Filed: July 29, 1975

[30] Foreign Application Priority Data

Aug. 5, 1974 France ............................. 74.27183

[51] Int. Cl.² ............................................ G11B 15/66
[52] U.S. Cl. .................................. 360/130; 360/85
[58] Field of Search ......................... 360/130, 84, 85

[56] References Cited

U.S. PATENT DOCUMENTS 3,665,120  5/1972  Larkin ............................... 360/85

FOREIGN PATENT DOCUMENTS 637,220  2/1962  Canada ............................... 360/84

Primary Examiner—Robert S. Tupper
Attorney, Agent, or Firm—Leydig, Voit, Osann, Mayer & Holt, Ltd.

[57] ABSTRACT

Apparatus for positioning and guiding magnetic tape around the drum of a rotary head assembly in a recording and/or reproducing mechanism, particularly for video tape. At least two guide fingers are provided for guiding the magnetic tape from a cartridge to a drum of the rotary head assembly. The guide fingers are mounted for movement between a retracted position where the guide fingers engage the magnetic tape in a cartridge, and an advanced position where the guide fingers dispose the tape along a predetermined helical path on the drum surface. At least one guide surface projects from the drum and cooperates with the guide fingers to guide the tape onto the predetermined helical path on the drum surface when the guide fingers are removed from the retracted position to the advanced position, and for maintaining the tape on the helical path during relative movement of the tape and the rotary head assembly. In the illustrative embodiment a plurality of knobs project from the drum to form a plurality of spaced guide surfaces which are positioned to engage the lower edge of the magnetic tape along the predetermined helical path. The outer faces of the knobs are rounded to permit the magnetic tape to slide smoothly thereover during movement of the tape along the drum surface. After the tape has passed over the rounded faces of the knobs, the lower edge of the tape rests on the cylindrical bases of the knobs to maintain the tape in precise alignment with the desired helical path.

4 Claims, 5 Drawing Figures

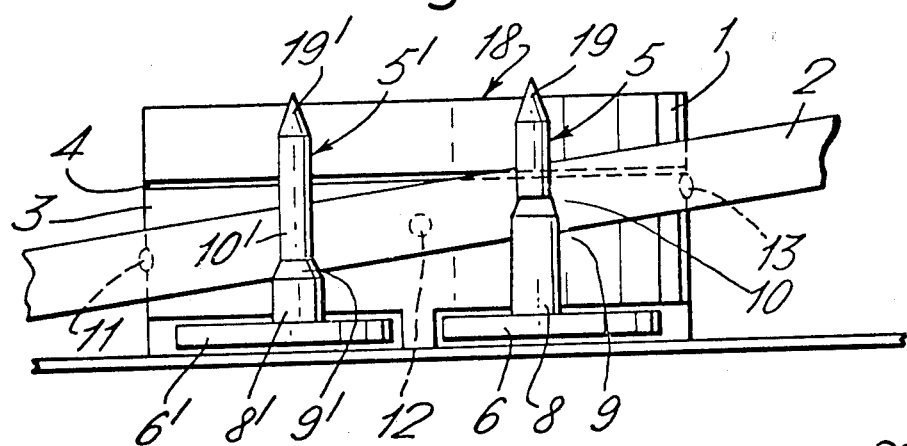
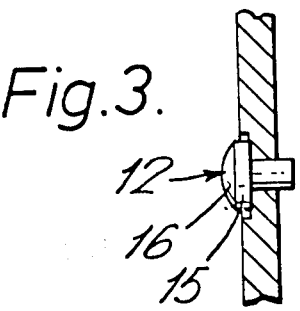
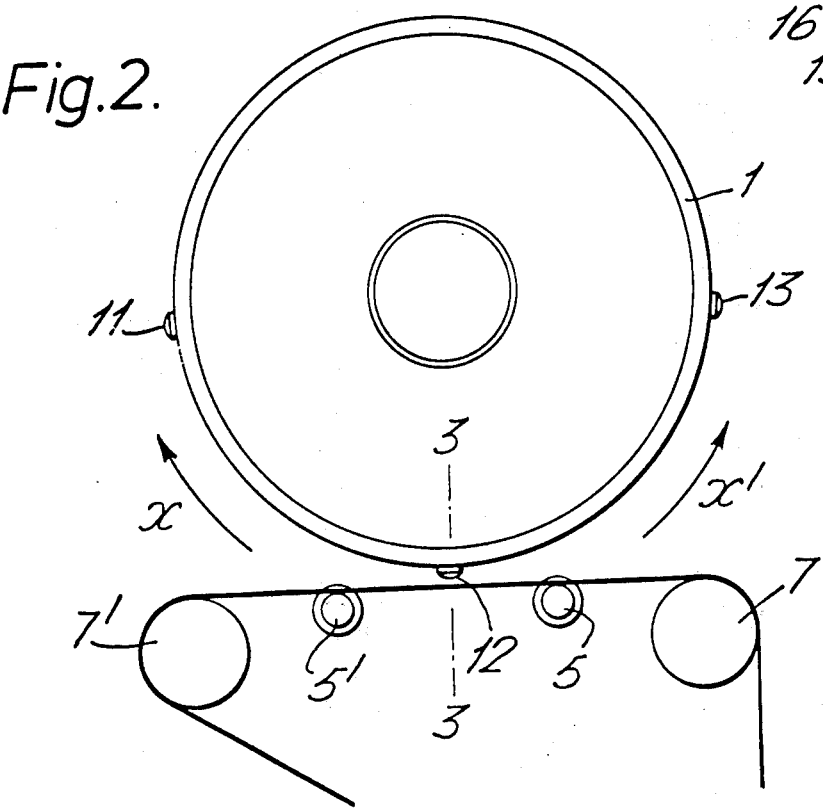

DEVICE FOR GUIDING AND WINDING MAGNETIC TAPE IN RECORDING AND/OR REPRODUCING APPARATUS

DESCRIPTION OF THE INVENTION

The invention relates to a device for guiding and positioning magnetic tape around the drum of a rotary head assembly in apparatus for recording and/or reproducing information on the magnetic tape, particularly in video tape recorders adapted to be used with self-contained tape cartridges.

In this type of apparatus, an information carrier in the form of a magnetic tape is wound in a helical path around a tape guide drum including one or more rotary video heads which interact with the magnetic tape for the recording and/or playback of video signals. These video signals are typically recorded along tracks which are parallel to each other and oblique relative to the longitudinal axis of the tape. Since the tape is wrapped around the drum helically, these video signal tracks lie in planes perpendicular to the axis of the drum when the tape is wound around the drum. As the tape moves around the drum, the video signal tracks are successively scanned by the rotating video head or heads. The rotational speed of these video heads and the speed at which the tape moves are coordinated in such a way that each of the signal tracks is accurately scanned over its entire length by each head. It is thus obvious that the magnetic tape must be positioned on the drum with a high degree of accuracy, so that the tracks will be precisely aligned with the rotary heads. The tape must also be positioned and guided around the drum in such a way that the tape always occupy the same position in relation to the rotary head assembly and that the length of tape in contact with the drum will remain constant. These requirements are all the more critical in view of the fact that the width of the tracks is of the order of only a tenth of a millimeter and adjacent tracks are spaced only a few hundredths of a millimeter apart.

A U.S. patent application filed concurrently herewith in the name of the present applicant and entitled "Device for Guiding and Winding Magnetic Tape In Recording and/or Reproducing Apparatus" describes a guiding device for positioning a magnetic tape around a rotary head assembly of video recording and/or reproducing apparatus by the use of two guide fingers mounted on flat supports movable in a horizontal plane. This device comprises driving means for moving the guide finger supports by pivoting them from a first position in which the magnetic tape is initially engaged by the guide fingers to a second position in which the magnetic tape is positioned along a helical path over an arc of about 180° on a drum containing the magnetic heads.

In a device of the type described in the aforementioned application, the tape positioning means must fulfill two essential requirements. The first requirement is that the magnetic tape be accurately positioned along a predetermined helical path on the drum surface, while the second requirement is that the tape be maintained on the helical path once it has been so positioned. The first requirement is all the more difficult to satisfy because the tape has to be raised and inclined while it is being driven by the guide fingers, so that when the tape is positioned on the drum its recording tracks will be precisely aligned with the rotary heads. The second requirement likewise involves serious problems, as the drum must be fitted with means to maintain the magnetic tape in its operative position while also preventing damage to the tape when it slides over these means during positioning of the tape on the drum. That is, the tape must be capable of moving up and down the walls of the drum easily when being placed in its operative position and yet be prevented from doing so once this position has been reached.

It has already been suggested that small blades might be provided on the external surface of the drum. This solution, however, suffers from the serious drawback that the magnetic tape may slide behind one of these blades and be damaged or even torn.

The purpose of the present invention is to provide a device for positioning the magnetic tape around the drum of a rotary head assembly, which device has a relatively simple design and sturdy construction, is free of the drawbacks mentioned above, and enables the magnetic tape to be accurately positioned and secured in the desired position.

In accordance with the invention there is provided a device for positioning and guiding magnetic tape around the drum of a rotary head assembly in a recording and/or reproducing mechanism having at least two guide fingers for guiding the magnetic tape and mounted for movement between a retracted position where the guide fingers engage the magnetic tape in a self-contained cartridge, and an advanced position where the guide fingers disposed the tape along a predetermined helical path on the drum surface, the improvement comprising at least one guide surface projecting from the drum and cooperating with the guide fingers for guiding the tape onto the predetermined helical path on the drum surface when the guide fingers are moved from the retracted position to the advanced position, and for maintaining the tape on the helical path during relative movement of the tape and rotary head assembly.

To enable the invention to be understood more clearly an embodiment will now be described by way of example with reference to the accompanying drawings, in which:

FIG. 1 is a front elevation of a tape positioning and guiding device embodying the invention with the guide fingers in their retracted positions;

FIG. 2 is a plan view of the device shown in FIG. 1;

FIG. 3 is an enlarged sectional view along the line 3—3 in FIG. 2;

Figure 4:
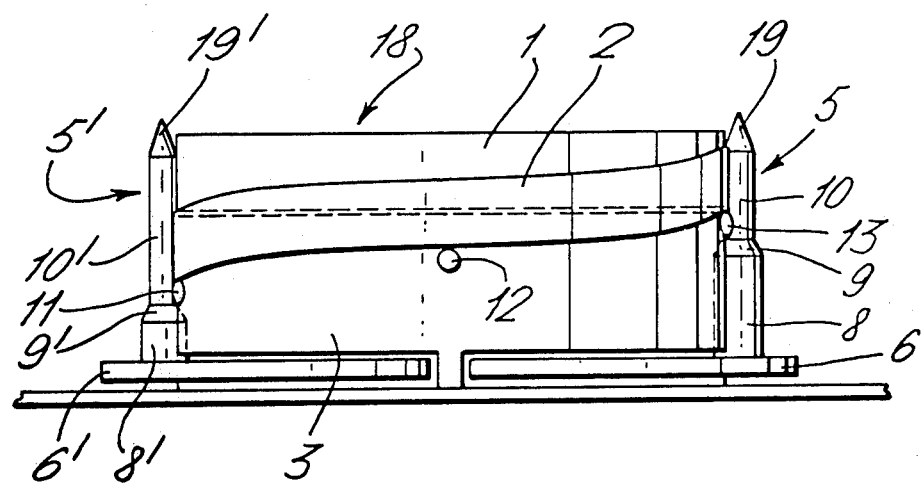
FIG. 4 is the same front elevation shown in FIG. 1, with the guide fingers in their advanced positions.

FIGS. 1 and 2 show a drum 18, comprising a rotary upper part 1 and a fixed lower part 3. Between these two parts 1 and 3 is a scanning line 4 for video heads (not shown) which are integral with the rotary part 1 for repetitively traversing a magnetic tape 2 which follows a helical path on the surface of the drum 18 over an arc of 180°. The two guide fingers 5 and 5' are mounted on supports 6 and 61 respectively for movement between retracted positions shown in FIG. 1 and advanced positions shown in FIG. 4. The drive for the supports 6 and 6', which does not form part of the present invention, is described in the U.S. patent application filed concurrently herewith in the name of the present applicants and already mentioned above.

The two ends of the magnetic tape 2 are engaged respectively in the core of a supply reel and the core of a take-up reel, which are stored in a self-contained cartridge (not shown). This cartridge is placed in a housing which can pivot together with the cartridge about a shaft so that a portion of tape situated between the reels will be positioned between the guide fingers 5, 5' and the drum 18. Since the reels are coaxially superimposed in the cartridge, one part of the tape is oblique in relation to the shafts of the reels and to that of the drum 18, as shown in FIG. 1. The cartridge contains not only the reels but also two guide rollers 7 and 7' (FIG. 2) to guide the tape from one reel to the other and render it taut so that it can be engaged by the guide fingers 5, 5' when the cartridge is being placed in position.

The two guide fingers 5, 5' comprise cylindrical bases 8, 8', frusto-conical or beveled shoulders 9, 9' and cylindrical upper parts 10, 10', surmounted by concical parts 19 and 19'. The beveled shoulders 9, 9' are the principal functional parts in positioning the magnetic tape.

In accordance with one important aspect of the invention, at least one guide surface projects from the drum and cooperates with the guide fingers for guiding the tape onto the predetermined helical path on the drum surface when the guide fingers are moved from the retracted position to the advanced position, and for maintaining the tape on the helical path during relative movement of the tape and rotary head assembly. Thus, in the illustrative embodiment, three projections or knobs 11, 12 and 13 provided on the periphery of the drum form three spaced projecting guide surfaces. One of these knobs is shown more clearly in FIG. 3. Each knob comprises a cylindrical portion 15 and a rounded head 16, with the cylindrial portion 15 extending slightly beyond the external surface of the drum 18. The shaft of the knob 12 is generally situated half-way between the two guide fingers 5, 5'. The knobs 11 and 13 are situated about 80° away from the knob 12, one on each side thereof, and are offset in the vertical direction in the manner described hereinafter.

Figure 5:
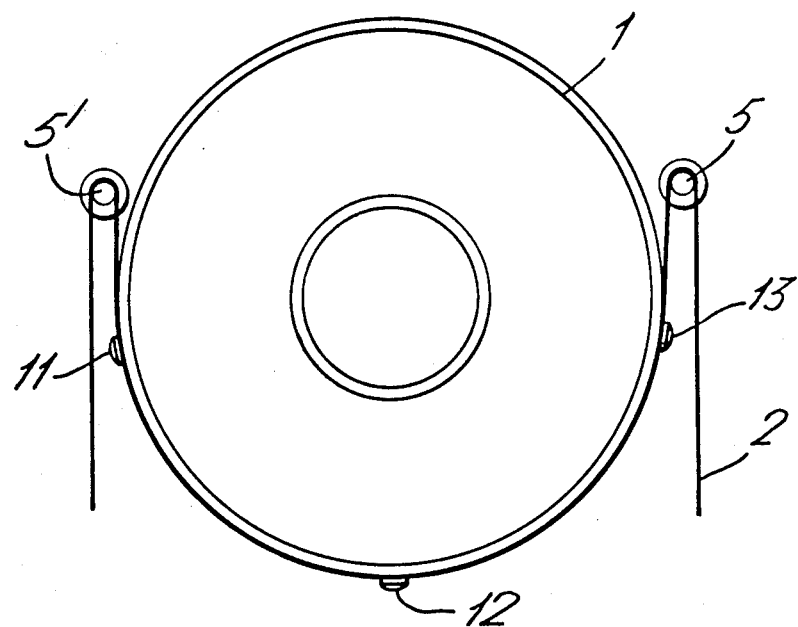
FIG. 5 is a plan view of the device shown in FIG. 4.

FIGS. 4 and 5 show the device of FIGS. 1-3 with the guide fingers 5, 5' in their advanced positions. Thus, the guide fingers 5, 5' have been moved along the periphery of the drum 18 and drawn the magnetic tape into its operative position (FIG. 5) on the drum surface. The magnetic tape 2 is in the contact with the drum 18 over exactly 180° and along a helical path. The vertical positions of the knobs 11, 12 and 13 on the drum 18 are such that the lower edge of the magnetic tape 2, when the latter is in the operative position, rests tangentially on the cylindrical portions 15 of the knobs, i.e., the centers of the knobs 11, 12 and 13, are situated on a helix which corresponds exactly to the lower edge of the desired helical path of the magnetic tape 2.

In the starting position shown in FIG. 1, the magnetic tape 2 ascents from the supply reel to the take-up reel, passing behind the guide fingers 5, 5'. It should be noted that the two guide fingers 5, 5' differ in the heights of their elements 8, 10 and 8', 10', respectively, so that the top edges of the two beveled shoulders 9, 9' are aligned with the bottom edges of the respective knobs 13 and 11. The vertical lengths of the beveled shoulder 9, 9' on the guide fingers 5, 5' is such that the lower edges of these shoulders 9, 9' coincide with the lower edge of the tape 2 in the starting position i.e., when the guide fingers are retracted. As the tape 2 is oblique, it is obvious that these beveled shoulders 9, 9' must be situated at different heights on the respective guide fingers 5, 5'. The conical tips 19 and 19' of the guide fingers 5 and 5' make it possible for the guide fingers 5, 5' to engage the magnetic tape 2, when the cartridge is being placed in position, without damaging the tape.

As and when the guide fingers 5, 5' move in the direction shown by the arrows X, X' in FIG. 2, to the advanced position shown in FIGS. 4 and 5, taking the tape 2 with them, the lower edge of the tape slides on the beveled shoulders 9, 9' of the guide fingers 5, 5' thereby causing the magnetic tape 2 to ascend along the guide fingers. When the magnetic tape 2 comes in contact with the knob 12 the ascent of the tape is assisted by the rounded convex shape of the outer face of the knob, which is located above the lower edge of the tape in its starting position, when the guide fingers 5, 5' are retracted. As the guide fingers 5, 5', continue to move toward the advanced position shown in FIGS. 4 and 5, the magnetic tape 2 ceases to be influenced by the beveled shoulders 9, 9', and ascends over the cylindrical portions 10, 10', but at this moment the tape comes in contact with the knobs 11 and 13, and the final positioning of the tape 2 is effected by the smooth sliding movement of the tape on the convex heads of the knobs 11, 12 and 13 until the tape reaches the final operative position shown in FIGS. 4 and 5.

It may be seen that thanks to the co-ordinated action of the knobs 11, 12 and 13 and the beveled shoulders 9, 9' of the guide fingers 5, 5', the advancing movement of the guide fingers automatically positions the magnetic tape 2 on the predetermined helical path around the drum 18. The positioning of the tape 2 is carried out in three stages. In a first stage, when the taper is not yet in contact with the drum, it is cammed upwardly by the beveled shoulders 9, 9' of the guide fingers 5, 5'. In a second stage, when the effect of the beveled shoulders 9, 9' is no longer sufficient, owing to partial contact between the tape 2 and the drum 18, the tape 2 continues its ascent over the external surface of the drum 18 under the dual action of the convex heads 16 of the knobs 11, 12 and 13 and of the beveled shoulders 9, 9' of the guide fingers 5, 5'. In the third stage, when the magnetic tape 2 has passed the beveled shoulders 9, 9', the final positioning of the tape is effected by the knobs 11, 12 and 13.

After the positioning of the magnetic tape 2 has been completed, the knobs 11, 12 and 13 serve to accurately maintain the tape 2 on the desired helical path during relative movement of the tape and the rotary head assembly for the reading or recording operation. As the direction of the head rotation is the same as that in which the magnetic tape moves, and the tape is slanted in relation to the drum 18, the rotary head tends to cause the magnetic tape 2 to move down over the drum surface. Any such movement of the tape would obviously result in deformation of the image, in view of the fact that the oblique recording tracks of the tape must be at the exact height of the scanning line 4 of the magnetic video heads. Since the cylindrical portions 15 of the knobs 11, 12 and 13 project slightly beyond the surface of the drum 18, the tape 2 is kept in its ideal position by the said three knobs.

Although the invention has been described by reference to a version which is particularly preferred, it goes without saying that this version is by no means limitative and that numerous modifications may be made thereto without departing from the scope of the invention. For example, the number of knobs is in no way limited to three and may be either above or below this number. Nor do the knobs need to be of exactly the same shape as that described in the foregoing; they may have any shape wich assists the sliding movement of the tape up and down and drum surface while the tape is being positioned, and at the same time reliably prevents any such movement of the tape when the desired operative position has been reached.

I claim as my invention:

1. In apparatus for positioning and guiding magnetic tape around the drum of a rotary head assembly in a recording and/or reproducing mechanism having at least two guide fingers for guiding the magnetic tape and mounted for movement between a retracted position where the guide fingers engage the magnetic tape in a self-contained cartridge, and an advanced position where the guide fingers dispose the tape along a predetermined helical path on the drum surface, the improvement comprising a plurality of guide surfaces projecting from the drum and having convex heads cooperating with said guide fingers for guiding the tape onto said predetermined helical path on the drum surface when the guide fingers are moved from said retracted position to said advanced position, and for maintaining the tape on said helical path during relative movement of the tape and rotary head assembly.

2. Apparatus as set forth in claim 1 wherein the projecting guide surfaces include cylindrical portions which support the lower edge of the magnetic tape along said predetermined helical path.

3. Apparatus as set forth in claim 1 wherein the projecting guide surface is located above the lower edge of the magnetic tape when the guide pins are in the retracted position.

4. Apparatus as set forth in claim 1 wherein said guide fingers include beveled shoulders for engaging the lower edge of the magnetic tape and guiding the tape onto said helical path when the fingers are moved from the retracted position to the advanced position.

* * * * *